US007877593B2

(12) United States Patent  (10) Patent No.: US 7,877,593 B2
Tomlin et al.  (45) Date of Patent: Jan. 25, 2011

(54) SITUATION SENSITIVE MEMORY PERFORMANCE

(75) Inventors: Andrew Tomlin, San Jose, CA (US); Carlos Gonzalez, Los Gatos, CA (US)

(73) Assignee: SanDisk Corporation, Milpitas, CA (US)

( * ) Notice: Subject to any disclaimer, the term of this patent is extended or adjusted under 35 U.S.C. 154(b) by 21 days.

(21) Appl. No.: 12/364,334

(22) Filed: Feb. 2, 2009

(65) Prior Publication Data

US 2009/0172386 A1  Jul. 2, 2009

Related U.S. Application Data

(63) Continuation of application No. 11/196,161, filed on Aug. 2, 2005, now Pat. No. 7,502,921.

(51) Int. Cl.
    *G06F 9/00* (2006.01)
(52) U.S. Cl. ........................ 713/100; 713/320
(58) Field of Classification Search ............... 713/100, 713/320, 340; 714/749, 733; 365/227, 228
See application file for complete search history.

(56) References Cited

U.S. PATENT DOCUMENTS

| 6,400,624 | B1 | 6/2002 | Parker et al. |
| 7,447,078 | B2 * | 11/2008 | Li .......................... 365/185.21 |
| 2002/0066001 | A1 | 5/2002 | Olarig et al. |
| 2003/0189856 | A1 | 10/2003 | Cho et al. |
| 2004/0264266 | A1 | 12/2004 | Fukushima et al. |
| 2005/0251617 | A1 * | 11/2005 | Sinclair et al. .............. 711/103 |
| 2006/0291301 | A1 * | 12/2006 | Ziegelmayer ................ 365/191 |

FOREIGN PATENT DOCUMENTS

| EP | 0663668 B1 | 11/2002 |
| JP | 63-237189 | 10/1988 |
| JP | H01-290200 | 11/1989 |
| JP | H04-237351 | 8/1992 |
| JP | 2003-100095 | 4/2003 |

OTHER PUBLICATIONS

Notification of Transmittal of the International Search Report and the Written Opinion of the International Searching Authority, or the Declaration for International Application No. PCT/US2006/027883 dated Dec. 22, 2006, 11 pages.
Notification of Reasons for Refusal, Japanese Patent Application No. 2008-524989 dated Apr. 26, 2010, 7 pages.
Notification of Reasons for Refusal, Japanese Patent Application No. 2008-524989 dated Sep. 1, 2009, 7 pages.

* cited by examiner

*Primary Examiner*—Vu A Le
(74) *Attorney, Agent, or Firm*—Davis Wright Tremaine LLP

(57) ABSTRACT

The present invention presents a non-volatile memory system that adapts its performance to one or more system related situation. If a situation occurs where the memory will require more than the allotted time for completing an operation, the memory can switch from its normal operating mode to a high performance mode in order to complete the operation quickly enough. Conversely, if a situation arises where reliability could be an issue (such as partial page programming), the controller could switch to a high reliability mode. In either case, once the trigging system situation has returned to normal, the memory reverts to the normal operation. The detection of such situations can be used both for programming and data relocation operations. An exemplary embodiment is based on firmware programmable performance.

34 Claims, 2 Drawing Sheets

SITUATION SENSITIVE MEMORY PERFORMANCE

CROSS-REFERENCE TO RELATED APPLICATION

This application is a continuation of U.S. application Ser. No. 11/196,161, filed Aug. 2, 2005, which is incorporated herein in its entirety by this reference.

FIELD OF THE INVENTION

This invention relates generally to reprogrammable non-volatile memory systems and their operation, and more specifically to techniques for optimizing programming performance.

BACKGROUND OF THE INVENTION

Reprogrammable non-volatile memory products are commercially successful and widely available today, particularly in the form of small form factor cards such as the CompactFlash cards (CF), Secure Digital cards (SD), MultiMediaCards (MMC) and Memory Stick cards that are produced by various vendors including SanDisk Corporation. Such cards typically use an array of flash Electrically Erasable and Programmable Read Only Memory (EEPROM) memory cells. Flash EEPROM memory cell arrays are typically produced either as NOR arrays or NAND arrays.

NOR Array

In a typical NOR array, memory cells are connected between adjacent bit line source and drain diffusions that extend in a column direction with control gates connected to word lines extending along rows of cells. One typical memory cell has a "split-channel" between source and drain diffusions. A charge storage element of the cell is positioned over one portion of the channel and the word line (also referred to as a control gate) is positioned over the other channel portion as well as over the charge storage element. This effectively forms a cell with two transistors in series, one (the memory transistor) with a combination of the amount of charge on the charge storage element and the voltage on the word line controlling the amount of current that can flow through its portion of the channel, and the other (the select transistor) having the word line alone serving as its gate. The word line extends over a row of charge storage elements. Examples of such cells, their uses in memory systems and methods of manufacturing them are given in U.S. Pat. Nos. 5,070,032, 5,095,344, 5,315,541, 5,343,063, and 5,661,053, and in co-pending U.S. patent application Ser. No. 09/239,073, filed Jan. 27, 1999.

A modification of this split-channel flash EEPROM cell adds a steering gate positioned between the charge storage element and the word line. Each steering gate of an array extends over one column of charge storage elements, perpendicular to the word line. The effect is to relieve the word line from having to perform two functions at the same time when reading or programming a selected cell. Those two functions are (1) to serve as a gate of a select transistor, thus requiring a proper voltage to turn the select transistor on and off, and (2) to drive the voltage of the charge storage element to a desired level through an electric field (capacitive) coupling between the word line and the charge storage element. It is often difficult to perform both of these functions in an optimum manner with a single voltage. With the addition of the steering gate, the word line need only perform function (1), while the added steering gate performs function (2). The use of steering gates in a flash EEPROM array is described, for example, in U.S. Pat. Nos. 5,313,421 and 6,222,762.

There are various programming techniques for injecting electrons from the substrate onto a floating gate storage element through the gate dielectric. The most common programming mechanisms are described in a book edited by Brown and Brewer, Nonvolatile Semiconductor Memory Technology, IEEE Press, section 1.2, pages 9-25 (1998). One technique, termed channel "hot-electron injection" (section 1.2.3), injects electrons from the cell's channel into a region of the floating gate adjacent the cell's drain. Another technique, termed "source side injection" (section 1.2.4), controls the substrate surface electrical potential along the length of the memory cell channel in a manner to create conditions for electron injection in a region of the channel away from the drain. Source side injection is also described in an article by Kamiya et al., "EPROM Cell with High Gate Injection Efficiency," IEDM Technical Digest, 1982, pages 741-744, and in U.S. Pat. Nos. 4,622,656 and 5,313,421.

Two techniques for removing charge from charge storage elements to erase memory cells are used in both of the two types of NOR memory cell arrays described above. One is to erase to the substrate by applying appropriate voltages to the source, drain and other gate(s) that cause electrons to tunnel through a portion of a dielectric layer between the storage element and the substrate. The other erase technique is to transfer electrons from the storage element to another gate through a tunnel dielectric layer positioned between them. In the first type of cell described above, a third erase gate is provided for that purpose. In the second type of cell described above, which already has three gates because of the use of a steering gate, the charge storage element is erased to the word line, without the necessity to add a fourth gate. Although this later technique adds back a second function to be performed by the word line, these functions are performed at different times, thus avoiding the necessity of making a compromise because of the two functions. When either erase technique is utilized, a large number of memory cells are grouped together for simultaneously erasure, in a "flash." In one approach, the group includes enough memory cells to store the amount of user data stored in a disk sector, namely 512 bytes, plus some overhead data. In another approach, each group contains enough cells to hold several thousand bytes of user data, equal to many disk sectors' worth of data. Multi-block erasure, defect management and other flash EEPROM system features are described in U.S. Pat. No. 5,297,148.

As in most all integrated circuit applications, the pressure to shrink the silicon substrate area required to implement some integrated circuit function also exists with flash EEPROM systems. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell. This is accomplished by dividing a window of a storage element charge level voltage range into more than two states. The use of four such states allows each cell to store two bits of data, eight states stores three bits of data per cell, and so on. A multiple state flash EEPROM structure and operation is described in U.S. Pat. Nos. 5,043,940 and 5,172,338.

Another type of memory cell includes two storage elements that may also be operated in multiple states on each storage element. In this type of cell, two storage elements are included over its channel between source and drain diffusions with a select transistor in between them. A steering gate is included along each column of storage elements and a word line is provided thereover along each row of storage elements. When accessing a given storage element for reading or programming, the steering gate over the other storage element of the cell containing the storage element of interest is raised sufficiently high to turn on the channel under the other storage element no matter what charge level exists on it. This effectively eliminates the other storage element as a factor in reading or programming the storage element of interest in the same memory cell. For example, the amount of current flowing through the cell, which can be used to read its state, is then a function of the amount of charge on the storage element of interest but not of the other storage element in the same cell. Examples of this cell array architecture and operating techniques are described in U.S. Pat. Nos. 5,712,180, 6,103,573 and 6,151,248.

NAND Array

Another flash EEPROM architecture utilizes a NAND array, wherein series strings of more than two memory cells, such as 16 or 32, are connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. An example of a NAND architecture array and its operation as part of a memory system is found in U.S. Pat. Nos. 5,570,315, 5,774, 397 and 6,046,935.

The charge storage elements of current flash EEPROM arrays and discussed in the foregoing referenced patents and articles are most commonly electrically conductive floating gates, typically formed from doped polysilicon material. Another type of memory cell useful in flash EEPROM systems utilizes a non-conductive dielectric material in place of a conductive floating gate to store charge in a non-volatile manner. Such a cell is described in an article by Chan et al., "A True Single-Transistor Oxide-Nitride-Oxide EEPROM Device," IEEE Electron Device Letters, Vol. EDL-8, No. 3, March 1987, pp. 93-95. A triple layer dielectric formed of silicon oxide, silicon nitride and silicon oxide ("ONO") is sandwiched between a conductive control gate and a surface of a semi-conductive substrate above the memory cell channel. The cell is programmed by injecting electrons from the cell channel into the nitride, where they are trapped and stored in a limited region. This stored charge then changes the threshold voltage of a portion of the channel of the cell in a manner that is detectable. The cell is erased by injecting hot holes into the nitride. See also Nozaki et al., "A 1-Mb EEPROM with MONOS Memory Cell for Semiconductor Disk Application," IEEE Journal of Solid-State Circuits, Vol. 26, No. 4, April 1991, pp. 497-501, which describes a similar cell in a split-gate configuration where a doped polysilicon gate extends over a portion of the memory cell channel to form a separate select transistor.

U.S. Pat. No. 5,851,881 describes the use of two storage elements positioned adjacent each other over the channel of the memory cell, one being such a dielectric element and the other a conductive floating gate. Two bits of data are stored, one in the dielectric element and the other in the floating gate. The memory cell is programmed into one of four different threshold level combinations, representing one of four storage states, by programming each of the two gates into one of two different charge level ranges.

Another approach to storing two bits in each cell utilizing a dielectric storage element has been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is obtained by separately reading binary states of the spatially separated charge storage regions within the dielectric.

Large Erase Blocks

Memory cells of a typical non-volatile flash array are divided into discrete blocks of cells that are erased together. That is, the block is the erase unit. Each block typically stores one or more pages of data, the page being the unit of programming and reading, although more than one page may be programmed or read in a single operation. Each page typically stores one or more sectors of data, the size of the sector being defined by the host system. An example is a sector of 512 bytes of user data, following a standard established with magnetic disk drives, plus some number of bytes of overhead information about the user data and/or the block in which it is stored.

It is sometimes necessary to erase blocks in order to free them up for a write operation. In this case, valid pages of data within the block to be erased (the original block) are consolidated and copied to another block (the update block) prior to erasing the original block. This process is called "garbage collection." During garbage collection, the remaining valid pages of data from the original block are copied from the original block to the update block. Once the copy operation is complete, the original block gets erased and then the update block becomes the original block.

The operation of such memory systems is a trade off between performance on the one hand and reliability and power consumption on the other. The operating parameters of the memory are selected so that sufficient time is allowed for all expected operations. If the time allowance is too high and the memory is run slowly, time out or low performance situations can result; while if the time allowance is too short and the memory is run fast, reliability and power consumption will suffer. Once a chosen timeout on the host side is agreed upon, the performance of the card is designed to a level sufficient so that all expected operations can be executed in the allotted time. To design to a higher level of performance is at the cost of lower reliability, greater power consumption, or, typically, both.

In the move to ever-larger block structures, there is an increased likelihood of the rare occurrence of a system situation leading to a time out. Examples would include a particularly involved garbage collection or a programming error. This is particularly the case in multi-state memories with their longer programming time. This problem can be dealt with by improving programming times to accommodate these unusual situations, but at the cost of worse reliability or higher power use for the vast majority of normal operating situations. Conversely, other operations need much less than the allotted time or are situations having reliability issues. In these cases, the system is operating at higher power consumption or lower reliability mode than necessary.

SUMMARY OF THE INVENTION

Generally, the present invention presents a non-volatile memory system adapts its performance to one or more system related situation. If a situation occurs where the memory will require more than the allotted time for completing an operation, the memory can switch from its normal operating mode to a high performance mode in order to complete the operation quickly enough. This allows the card to avoid issue of timeout, while minimizing the reliability issues of reducing programming time. The detection of such high latency operations can be used both for programming and data relocation operations. For example, during a garbage collection operation, if an error occurs or there is the need for the relocation of a particularly large amount of data, the amount of error detection and correction operations performed on the data can be reduced. As another example, to increase programming speed in such a situation, the clock rate of the system can be increased or the characteristics of the programming pulses (such as size or duration) can be altered.

Conversely, if a situation arises where reliability could be an issue (such as partial page programming), the controller could switch to a high reliability mode. Examples of special, high reliability sequences could include using a higher level of ECC, slower clock rates, or less disruptive programming sequences. In either case, once the trigging system's operational situation has returned to normal, the memory reverts to the normal operating. An exemplary embodiment is based on firmware programmable performance.

Additional aspects, features and advantages of the present invention are included in the following description of specific representative embodiments, which description should be taken in conjunction with the following drawings.

DESCRIPTION OF REPRESENTATIVE EMBODIMENTS

Figure 1:
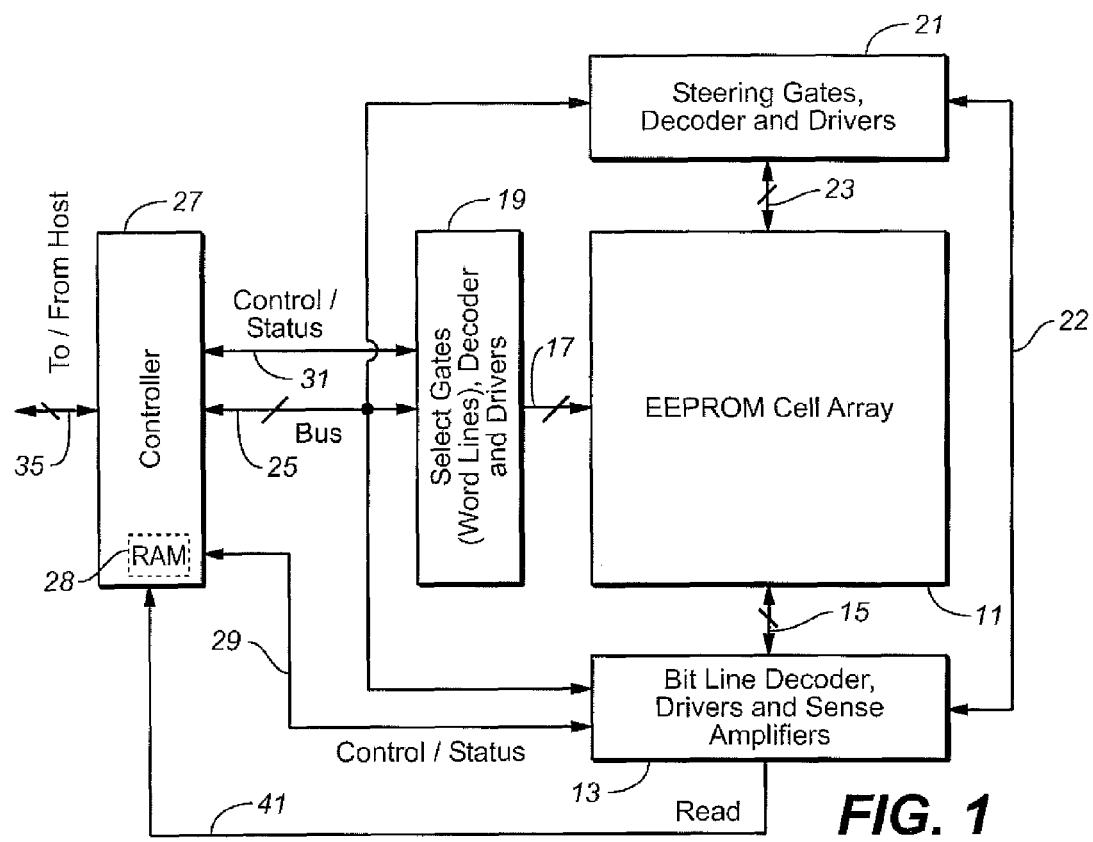
FIG. 1 is a block diagram of a first non-volatile memory system in which the present invention may be implemented.

FIG. 1 is a block diagram of a first non-volatile memory system in which the present invention may be implemented. A large number of individually addressable memory cells 11 are arranged in a regular array of rows and columns, although other physical arrangements of cells are certainly possible. This system is particularly adapted for the array 11 to be the NOR type, as described above in the Background and in references incorporated herein. Bit lines, designated herein to extend along columns of the array 11 of cells, are electrically connected with a bit line decoder and driver circuit 13 through lines 15. Word lines, which are designated in this description to extend along rows of the array 11 of cells, are electrically connected through lines 17 to a word line decoder and driver circuit 19. Steering gates, which extend along columns of memory cells in the array 11, are electrically connected to a steering gate decoder and driver circuit 21 through lines 23. Each of the decoders 13, 19 and 21 receives memory cell addresses over a bus 25 from a memory controller 27. The decoder and driving circuits are also connected to the controller 27 over respective control and status signal lines 29, 31 and 33. Voltages applied to the steering gates and bit lines are coordinated through a bus 22 that interconnects the decoder and driver circuits 13 and 21. The controller includes various types of registers and other memory including a volatile random-access-memory (RAM) 28.

The controller 27 is connectable through lines 35 to a host device (not shown). The host may be a personal computer, notebook computer, digital camera, audio player, various other hand held electronic devices, and the like. The memory system of FIG. 1 will commonly be implemented in a card according to one of several existing physical and electrical standards, such as one from the PCMCIA, the CompactFlash™ Association, the MMC™ Association, and others. When in a card format, the lines 35 terminate in a connector on the card that interfaces with a complementary connector of the host device. The electrical interface of many cards follows the ATA standard, wherein the memory system appears to the host as if it was a magnetic disk drive. Other memory card interface standards also exist. As an alternative to the card format, a memory system of the type shown in FIG. 1 may be permanently embedded in the host device.

The decoder and driver circuits 13, 19 and 21 generate appropriate voltages in their respective lines of the array 11, as addressed over the bus 25, according to control signals in respective control and status lines 29, 31 and 33, to execute programming, reading and erasing functions. Any status signals, including voltage levels and other array parameters, are provided by the array 11 to the controller 27 over the same control and status lines 29, 31 and 33. A plurality of sense amplifiers within the circuit 13 receive current or voltage levels that are indicative of the states of addressed memory cells within the array 11, and provides the controller 27 with information about those states over lines 41 during a read operation. A large number of sense amplifiers are usually used in order to be able to read the states of a large number of memory cells in parallel. During reading and program operations, one row of cells is typically addressed at a time through the circuits 19 for accessing a number of cells in the addressed row that are selected by the circuits 13 and 21. During an erase operation, all cells in each of many rows are typically addressed together as a block for simultaneous erasure.

Operation of a memory system such as illustrated in FIG. 1 is further described in patents and articles identified in the NOR Array section of the Background above, and in other patents assigned to SanDisk Corporation, assignee of the present application. In addition, U.S. patent application Ser. No. 09/793,70, filed Feb. 26, 2001, describes a data programming method, which application is incorporated herein by this reference.

Figure 2:
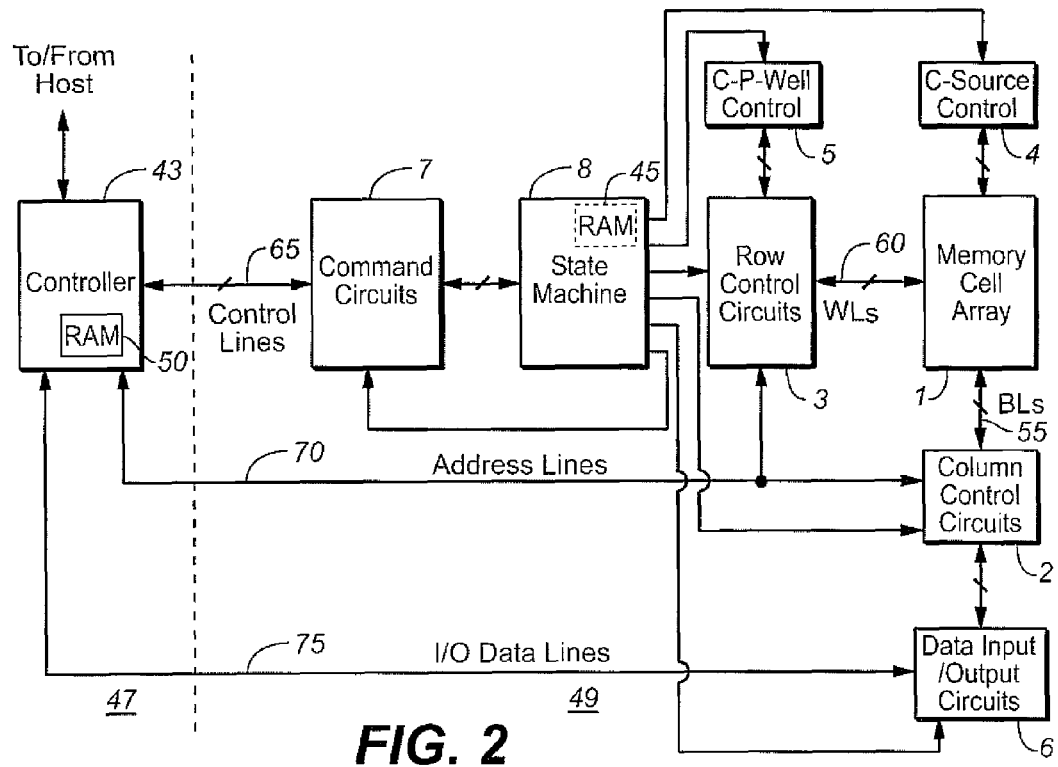
FIG. 2 is a block diagram of a first non-volatile memory system in which the present invention may be implemented.

FIG. 2 is a block diagram of another non-volatile memory system in which the present invention may be implemented. Memory cell array 1 includes a plurality of memory cells M arranged in a matrix is controlled by a column control circuit 2, a row control circuit 3, a c-source control circuit 4 and a c-p-well control circuit 5. The memory cell array 1 may be of the NAND type that is described above in the Background and in references incorporated herein by reference. A control circuit 2 is connected to bit lines (BL) of the memory cell array 1 for reading data stored in the memory cells (M), for determining a state of the memory cells (M) during a program operation, and for controlling potential levels of the bit lines (BL) to promote the programming or to inhibit the programming. The row control circuit 3 is connected to word lines (WL) to select one of the word lines (WL), to apply read voltages, to apply a program voltages combined with the bit line potential levels controlled by the column control circuit 2, and to apply an erase voltage coupled with a voltage of a p-type region on which the memory cells (M) are formed. The c-source control circuit 4 controls a common source line (labeled as "c-source" in FIG. 2) connected to the memory cells (M). The c-p-well control circuit 5 controls the c-p-well voltage.

The data stored in the memory cells (M) are read out by the column control circuit 2 and are output to external I/O lines via an I/O line and a data input/output buffer 6. Program data to be stored in the memory cells are input to the data input/output buffer 6 via the external I/O lines, and transferred to the column control circuit 2. The external I/O lines are connected to a controller 43. The controller 43 includes various types of registers and other memory, typically in a volatile random access memory (RAM) 50.

Command data for controlling the flash memory device are inputted to command circuits 7 connected to external control lines that are connected with the controller 43. The command data informs the flash memory of what operation is requested. The input command is transferred to a state machine 8 that controls the column control circuit 2, the row control circuit 3, the c-source control circuit 4, the c-p-well control circuit 5 and the data input/output buffer 6. The state machine 8 can output a status data of the flash memory such as READY/BUSY or PASS/FAIL. The state machine 8 also includes a number of registers and other volatile random-access-memory 45.

The controller 43 is connected or connectable with a host system such as a personal computer, a digital camera, or a personal digital assistant. It is the host that initiates commands, such as to store or read data to or from the memory array 1, and provides or receives such data, respectively. The controller converts such commands into command signals that can be interpreted and executed by the command circuits 7. The controller also typically contains buffer memory for the user data being written to or read from the memory array. A typical memory system includes one integrated circuit chip 47 that includes the controller 43, and one or more integrated circuit chips 49 that each contain a memory array and associated control, input/output and state machine circuits. The trend, of course, is to integrate the memory array and controller circuits of a system together on one or more integrated circuit chips.

Either of the memory systems of FIGS. 1 and 2 may be embedded as part of the host system, or may be included in a memory card that is removably insertable into a mating socket of a host system. Such a card may include the entire memory system, or the controller and memory array, with associated peripheral circuits, may be provided in separate cards. Several card implementations are described, for example, in U.S. Pat. No. 5,887,145, which patent is expressly incorporated herein in its entirety by this reference.

According to a primary aspect of the present invention, the memory adapts its performance to one or more system related situations. For example, if a situation occurs where the memory will require more than the allotted time for completing an operation, the memory can switch from its normal operating mode to a high performance mode in order to complete the operation quickly enough. This allows the card to avoid issue of timeout, while minimizing the reliability issues of reducing programming time. Conversely, if a situation arises where reliability could be an issue, could switch to a high reliability mode; for example, this can reduce the program disturb issue caused by partial programming. In either case, once the triggering system situation has returned to normal, the memory reverts to the normal operating. An exemplary embodiment is based on firmware programmable performance.

The firmware would issue a special command sequence to go into fast programming/low endurance mode during critical timeout circumstances. At other times, this mode would not be used and a slower/high endurance mode would be used. This would significantly reduce the engineering effort in device design caused by tradeoff between programming time and endurance. A complimentary aspect is to use a slow method during partial page programming and other situations that could result in reliability problems to reduce disturb effect.

More specifically, the present invention address issues such as those caused by large block sizes (as driven by technology), programming time during garbage collection, and host interface latency issues. For example, the specification for the SD card specifies a timeout of 250 ms. The time to perform a garbage collection is typically:

$$T_{garbage} = (\text{Data Transfer time} * \text{Sectors garbage collected}) + \\ (\text{Program time} + \text{Read time}) * \\ (\text{Sectors Garbage collected}) / \text{parallelism} + \text{Erase Time}$$

The second of these three components is typically the biggest part. Various aspects of data relocation and garbage collection are discussed in U.S. Pat. No. 6,266,273 and U.S. patent application Ser. No. 10/846,289, filed May 13, 2004, Ser. No. 10/915,039, filed Aug. 9, 2004, and Ser. No. 11/022,350, filed Dec. 21, 2004. (Although the data relocation operation is referred to as on-chip copy for historical reasons, more generally the relocation may be to another chip or sub-array (plane) on the same chip. This is described further in co-pending U.S. patent application Ser. No. 11/022,462, filed Dec. 21, 2004.)

Various methods can be employed to reduce this time, which is critical to avoiding high latency problems. Typically they fall into several categories:

1. Reduced Data transfer or data transfer time,
2. Reducing Program time,
3. Increased parallelism All of these techniques are trying to offset the trend to increase the number of sectors undergoing concurrent garbage collection. Typically, the first two have an impact on reliability as they often involve a trade-off between speed and reliability. Methods for reducing the amount of data transfer, such as that resulting from on-chip copy and associated data sampling, are described in U.S. patent application Ser. No. 10/901,849 filed Jul. 28, 2004, and Ser. No. 11/022,350, filed Dec. 21, 2004. Programming time is typically reduced through device design and optimization, such as is described in the various references cited in the Background, as are methods for increasing parallelism.

However, from a system perspective the worst-case garbage collection is less frequent than typical garbage collection. The invention takes advantage of this fact and only performs some of the reliability effecting optimizations when needed. The system can always detect when it is in a high latency situation and can trigger these methods as required. By only performing reliability-affecting optimizations at these times, the overall reliability is improved while avoiding time outs.

Examples of system related situations that can act as triggers during the operation of the memory system include:

1. Command requires garbage collection that exceeds threshold number of sectors.
2. Programming error resulting in error garbage collection.
3. A programming error occurs during garbage collection operation that requires subsequent additional garbage collection.

A data relocation can be relatively time consuming, particularly if the data is checked and corrected. For most such garbage collections, the is sufficient time allotted; however, if an usually large amount of data needs to be moved, a time out may result. Even is the number of sectors being relocated is below this threshold, if the garbage collection is the result of a programming error—or a programming occurs during a relocation—, the extra time for all the combined operations may exceed the threshold. Particularly in multi-state memories, which typically require longer programming times, such situations can lead to the threat of a timeout situation. If the controller detects any of these situations as imminent or having occurred, the memory can switch to a higher performance mode.

A number of optimizations are possible, either individually or in combination, according to various embodiments of the present invention. These possibilities include 1. Reduce ECC Data sampling for on-chip copy, possibly even to none.
2. Use different command sequence to the memory in the special mode, such as to utilize a fast programming sequence or to reduce power consumption. For example, the system could use non-write cache programming sequence to reduce power consumption if in low power mode.
3. Modify memory parameters to speed up programming time relative to normal programming parameters.
4. Extension to writing in binary for fast operations.

U.S. patent application Ser. No. 11/022,350, filed Dec. 21, 2004, describes techniques where ECC data is not checked during every transfer, but only for some transfers, based on a sampling or other methods. In order to increase performance in time-critical situations, this mechanism can be used and ECC checking be reduced or even skipped. As for modifying memory parameters (such as those described in the references on NAND memory arrays cited in the Background), examples could include altering programming pulse size or duration, or verification techniques. Details of memories that can be operated in either a binary mode (for increased speed or reliability) or a multi-state mode (for higher storage density) are presented in U.S. patent application Ser. No. 10/886,302, filed Jul. 6, 2004, and U.S. Pat. No. 5,930,167; although used for somewhat different purposes, these methods can be adapted to the present invention. These and other ways to improve performance can be used individually or in combination, where the more preferable techniques may vary from application to application. Additionally, the may be combined in a graduated manner to provide several levels of increased performance so that the more drastic techniques are only invoked in the most extreme cases.

Figure 3:
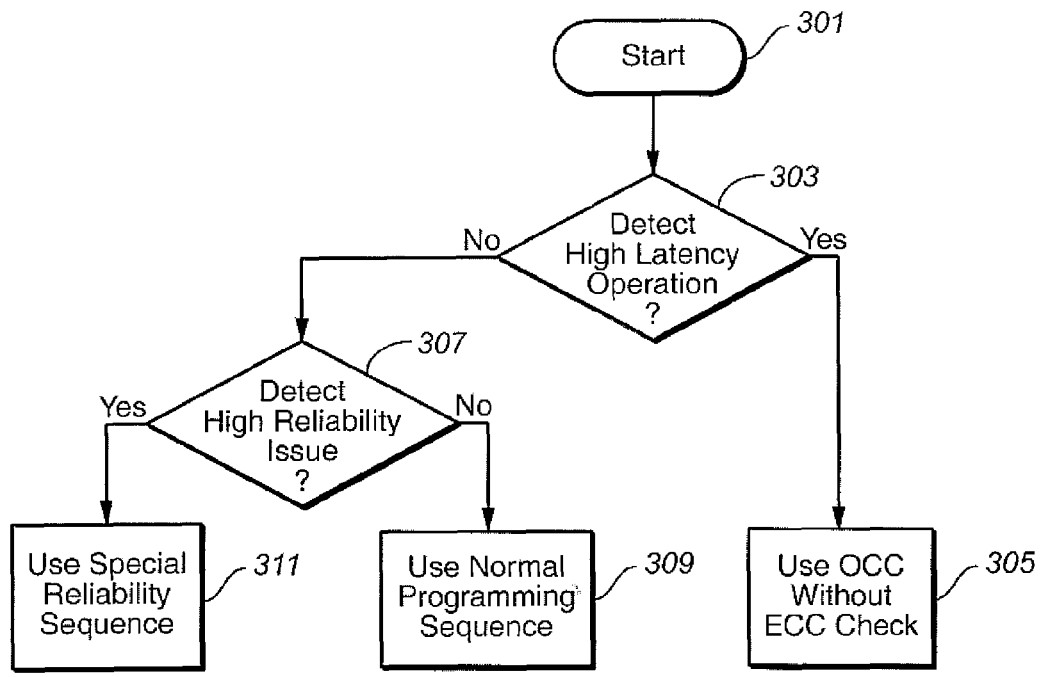
FIG. 3 shows an example of on-chip copy optimization.

FIG. 3 shows an example of on-chip copy optimization. The exemplary on-chip copy process starts at 301, with step 303 determining whether there is an system related situation associated with a high latency operation. Examples of typical high latency events include a full garbage collection, an error during programming, an error during garbage collection, or the other various triggering events described. If such a situation is found, in step 305 the memory switches to a mode where ECC check in on-chip copy (OCC) operations is reduced or curtailed in order to increase speed. For example, the threshold on when to correct ECC errors (such as during copy or post-writes reads) can be raised.

It may also be possible to spread out data transfers (or other long-latency operations) over several busy periods between transfers. This sort of rescheduling or spreading an operation over several cycles can help to ameliorate high latency operations, both those of step 305 or those of step 405 discussed below with respect to FIG. 4.

Returning to FIG. 3, if a there is no indication of an impending high latency operation, step 307 can check for possible reliability issues. Examples of high reliability issues include partial page programming or low voltage condition. If there are no system related situations associated with reliability issues, the normal programming sequence is used at 309. If a reliability situation is determined, a special sequence can be used instead at step 311. Examples of methods to improve reliability include lowering the threshold on when to correct ECC errors or increasing programming time through a larger number of smaller programming steps.

The exemplary embodiment of FIG. 3 includes on-chip copy optimized for both high latency operations and high reliability situations. These are independent aspects and the process need not have both of steps 303 and 307. For example, the high reliability issue determination could be eliminated, removing step 307 (and step 311) and have the "No" path from 303 go directly to 309. Alternately, step 303 (and step 305) can be eliminated, with the flow going directly from 301 to 307. In actual implementations, there may arise cases of a systemic use that would result in the continuous, or at least extended, use of the optimized data relocation. In such cases, there is preferable included a mechanism to ensure that the ECC of the data is eventually checked at some interval.

The memory can return to its normal operating mode in a number of different ways, depending on the implementation. For example, it may be that the special mode needs to specified for each cycle, that the special mode is limited to the duration of a particular command sequence, that a command is used to return to the normal mode, or some combination of these.

Figure 4:
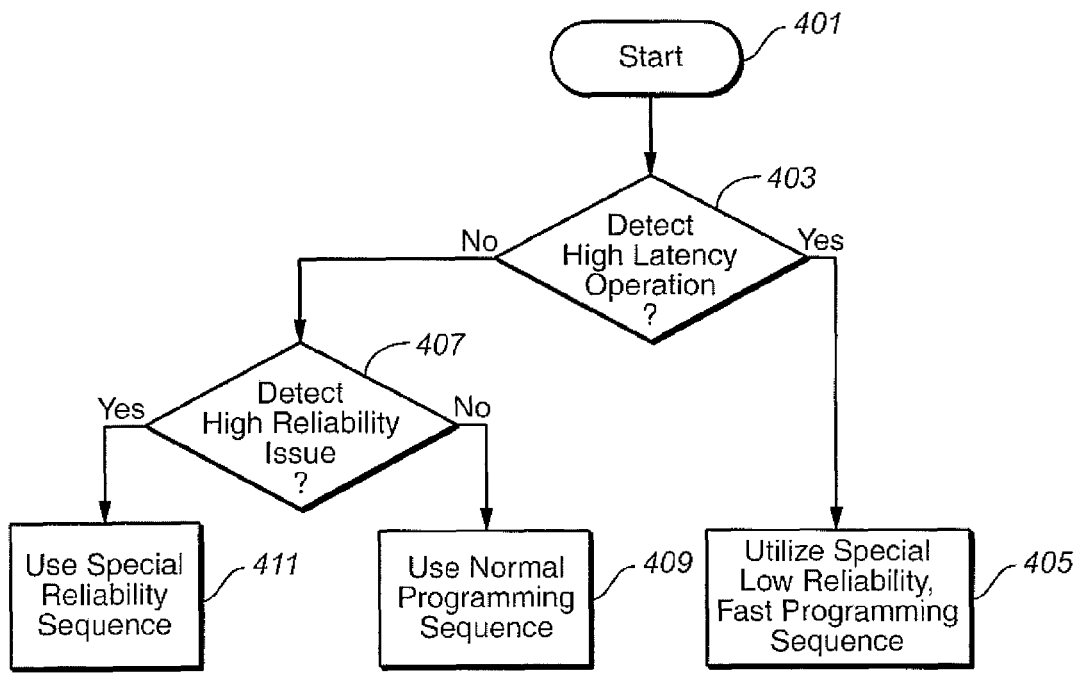
FIG. 4 shows an example of programming optimization.

FIG. 4 shows an example of an embodiment that optimizes programming based on related situations related to system operation, where the various branchings are similar to those of FIG. 3. Steps 403 and 407 determine, respectively, whether there is a high latency operation or reliability issues, where examples of these situations are as in the on-chip copy case. If there is a high latency situation with danger of a time out, a fast programming sequence can be employed (step 405), possibly at the expense of reliability, power consumption, or both. If the system's situation indicates that the latency time is not a problem, but reliability may be, a program sequence of higher reliability can be utilized (step 411). (Although presented in terms of reliability, the case of utilizing a low power mode, which may or may not be the same as the high reliability sequence, can similarly be implemented if there is adequate time available.) The normal programming sequence (step 409) can be used when there are neither reliability issues nor time out dangers.

One specific example of an system related situation when even worse reliability sequences may need to be compensated for is partial programming. Partial programming is one of the more difficult NAND parameters to optimize due to disturb mechanisms. However, from a system perspective the system knows when a partial programming sequence is required. Special slow or low disturb mechanisms could be used in this case. In some cases, the NAND memory itself may be able to detect this sequence and optimize itself instead of requiring a separate command sequence.

There are a number of possible embodiments for speeding up the memory in step 405, which can be used individually or combined. One implementation is to change the clock speed on the memory; for example, lower power systems operating at 30 MHz could switch to 60 MHz, and a standard 60 MHz system could go to an even faster clock. In other implementations, the characteristics of the programming pulses (duration, step size, etc.) can be switched. (Conversely, all these sorts of changes can be switched the other direction in the special reliability sequences of step 411.)

In systems that incorporate a post-write read to ensure that data was written correctly, this step can be skipped in the fast mode. Scrub operations (such as those described in U.S. Pat. No. 5,532,962) and wear-leveling operations used to improve memory reliability can be curtailed in critical situations. Further, the voltage regulator or other power source can be modified for improved speed/reliability at the expense of power consumption, for example switching between high- or low-current modes.

Many of the implementations for special high reliability programming sequences are the converse of those described above for step 405. These include adding post-write read or other such system features, modifying the voltage regulator or other power source for improved reliability vs. power consumption, altering the characteristics of the programming pulses, and so on.

Depending on the particular characteristics of the memory used, various implementation issues may need to be addressed. For example, the changing of write characteristics (either to be faster or slower) may change the distribution of the data states and affect the reading back of the data. When such problems may arise, the system preferably has a mechanism for either tracking or detecting the differing write conditions during the read process, as required. This could include the altering of read margins (or the use of "heroic" read sequences) during a data read-back.

Although shown separately here, the embodiments of FIGS. 3 and 4, along with their variations, can be combined; for example, in an on-chip copy operation where a high latency situation arises, the programming associated with the on-chip copy of step 305 can employ the fast programming sequence of step 405. Additionally, as with FIG. 3, FIG. 4 includes optimization for both high latency operations and high reliability situations. As before, these are independent aspects.

Additionally, although steps 305 and 405 refer to a single high performance mode, more generally a number of graduated high performance modes may be used. Depending upon the severity of the situation, the appropriate performance mode can be selected. Similarly, a number of graduated levels of increasing reliability can be used in steps 311 and 411. As with the other aspects described above, these various aspects may be implemented in hardware, software, or, in the preferred embodiment, through programmable firmware.

The above presents various techniques for improving the performance of memory systems. A number of other techniques for improving performance are described in U.S. patent applications Ser. No. 10/901,849 filed Jul. 28, 2004, and Ser. No. 10/886,302, filed Jul. 6, 2004, both of which are cited above. The various aspects of these applications are complimentary and can be combined.

Although the various aspects of the present invention have been described with respect to specific exemplary embodiments, it will be understood that the invention is entitled to protection within the full scope of the appended claims.

The patents, patent applications, articles and book portions identified above are all hereby expressly incorporated in their entirety into this Background by these references.

It is claimed:

1. A memory system, comprising:
  a memory having a rewritable data storage portion; and
  a controller for managing data stored in the memory and controlling the transfer of data between the memory system and a host to which it is connected, where the controller can operate the memory system according to a plurality of modes, each of the modes having a different level of performance for operations involving the writing of data, including a second mode of higher performance than a first mode, wherein the controller operates the memory normally according to the first of the modes and, in response to the controller determining a system related high latency situation, the controller instead operates the memory according to the second of the modes.

2. The memory system of claim 1, wherein said high latency situation is an error during programming.

3. The memory system of claim 1, wherein said high latency situation is an error during a data relocation operation.

4. The memory system of claim 1, wherein said high latency situation is a garbage collection operation.

5. The memory system of claim 1, wherein the second of the modes uses a lower level of error detection and correction than the first of the modes.

6. The memory system of claim 1, wherein the second of the modes uses a faster programming sequence than the first of the modes.

7. The memory system of claim 6, wherein the second of the modes uses a faster clock speed than the first of the modes.

8. The memory system of claim 7, wherein the second of the modes uses programming pulses of longer duration than the first of the modes.

9. The memory system of claim 7, wherein the second of the modes uses programming pulses of greater amplitude than the first of the modes.

10. The memory system of claim 1, wherein the controller additionally operates the memory according to a third of the modes in response to an additional system related situation, wherein the third of the modes is of greater reliability than the first of the modes.

11. The memory system of claim 10, wherein the additional system related situation is partial page programming.

12. The memory system of claim 10, wherein the additional system related situation is a low voltage condition.

13. The memory system of claim 10, wherein the third of the modes utilizes a higher degree of error detection and correction than the first of the modes.

14. The memory system of claim 10, wherein the third of the modes utilizes a slower programming sequence than the first of the modes.

15. The memory system of claim 10, wherein the third of the modes utilizes a slower clock rate than the first of the modes.

16. The memory system of claim 10, wherein the third of the modes utilizes programming pulses of shorter duration than the first of the modes.

17. The memory system of claim 10, wherein the third of the modes uses programming pulses of lesser amplitude than the first of the modes.

18. A method of operating a memory system comprising a memory having a rewritable data storage portion and a controller for managing data stored in the memory and controlling the transfer of data between the memory system and a host to which the memory system is connected where the controller can operate the memory system according to a plurality of modes, each of the modes having a different level of performance for operations involving the writing of data, including a second mode of higher performance than a first mode, the method comprising:

operating the memory according to the first of the modes;

subsequently determining by the controller of a system related high latency situation;

in response to said determining of a system related high latency situation, the controller selecting a second of the modes for the for operation of the memory system; and subsequently operating the memory according to the second of the modes instead of the first of the modes.

19. The method of claim 18, wherein said high latency situation is an error during programming.

20. The method of claim 18, wherein said high latency situation is an error during a data relocation operation.

21. The method of claim 18, wherein said high latency situation is a garbage collection operation.

22. The method of claim 18, wherein the second of the modes uses a lower level of error detection and correction than the first of the modes.

23. The method of claim 18, wherein the second of the modes uses a faster programming sequence than the first of the modes.

24. The method of claim 18, wherein the second of the modes uses a faster clock speed than the first of the modes.

25. The method of claim 18, wherein the second of the modes uses programming pulses of longer duration than the first of the modes.

26. The method of claim 18, wherein the second of the modes uses programming pulses of greater amplitude than the first of the modes.

27. The method of claim 18, further comprising:

determining by the controller of an additional system related situation; and in response to said determining an additional system related situation, operating the memory according to a third of the modes in response to an additional system related situation, wherein the third of the modes is of greater reliability than the first of the modes.

28. The memory system of claim 27, wherein the additional system related situation is partial page programming.

29. The memory system of claim 27, wherein the additional system related situation is a low voltage condition.

30. The memory system of claim 27, wherein the third of the modes utilizes a higher degree of error detection and correction than the first of the modes.

31. The memory system of claim 27, wherein the third of the modes utilizes a slower programming sequence than the first of the modes.

32. The memory system of claim 27, wherein the third of the modes utilizes a slower clock rate than the first of the modes.

33. The memory system of claim 27, wherein the third of the modes utilizes programming pulses of shorter duration than the first of the modes.

34. The memory system of claim 27, wherein the third of the modes uses programming pulses of lesser amplitude than the first of the modes.

* * * * *